(12) United States Patent
Obradovic

(10) Patent No.: US 11,710,184 B2
(45) Date of Patent: *Jul. 25, 2023

(54) SYSTEM, METHOD, AND PROGRAM PRODUCT FOR LOCAL INVESTMENT NETWORKING

(71) Applicant: Zoran Obradovic, Altona North (AU)

(72) Inventor: Zoran Obradovic, Altona North (AU)

( * ) Notice: Subject to any disclaimer, the term of this patent is extended or adjusted under 35 U.S.C. 154(b) by 0 days.

This patent is subject to a terminal disclaimer.

(21) Appl. No.: 17/539,536

(22) Filed: Dec. 1, 2021

(65) Prior Publication Data

US 2022/0253939 A1    Aug. 11, 2022

Related U.S. Application Data

(63) Continuation of application No. 16/122,851, filed on Sep. 5, 2018, now Pat. No. 11,205,230.

(60) Provisional application No. 62/554,450, filed on Sep. 5, 2017.

(51) Int. Cl.
| | |
|---|---|
| *G06Q 40/06* | (2012.01) |
| *H04L 67/52* | (2022.01) |
| *G06F 16/29* | (2019.01) |
| *G06Q 50/00* | (2012.01) |

(52) U.S. Cl.
CPC ............ *G06Q 40/06* (2013.01); *G06Q 50/01* (2013.01); *H04L 67/52* (2022.05); *G06F 16/29* (2019.01)

(58) Field of Classification Search
CPC ..................................................... G06Q 40/06
See application file for complete search history.

(56) References Cited

U.S. PATENT DOCUMENTS

| | | | |
|---|---|---|---|
| 2014/0095293 A1* | 4/2014 | Abhyanker | G06Q 50/01 |
| 2014/0279682 A1* | 9/2014 | Feldman | G06Q 40/06 |

OTHER PUBLICATIONS

Phillips, et al. (2017), in "Using Social Media to Predict the Future: A Systematic Literature Review." (Year: 2017).*

* cited by examiner

*Primary Examiner* — Olabode Akintola
*Assistant Examiner* — Brandon M Duck
(74) *Attorney, Agent, or Firm* — Ariel S. Bentolila; Bay Area IP Group, LLC

(57) ABSTRACT

A system and method comprising logging into a crowdfunding site; selecting at least an opportunity listed in said crowdfunding site; uploading said selected opportunity; providing a geospatial location identifier for at least one of, a local entrepreneur, an investment opportunity, and local investor in order to utilize a geospatial search and discovery processes for local investment; showcasing, by said crowdfunding site, said selected opportunity; searching for local investments; matching an investment searched for in a geographic region; choosing said matched investment according to said geographic location identifier; and displaying said searched local investment on a geospatial mapping server.

18 Claims, 10 Drawing Sheets

| 605 | USER NAVIGATES SEARCH PANEL AND INPUTS VARIOUS KEYWORDS, CATEGORIES AND GEOGRAPHICAL LOCATIONS OF INTEREST |

| 610 | MAPPING SERVER TO BE DISPLAYED SHOWING SEARCH QUERY IN RELATION TO RELEVANT OPPORTUNITES BY WAY OF GEOSPATIAL MARKERS |

| 615 | MARKERS CAN BE INDIVIDUALLY CLICKED ON TO DISPLAY MORE INFORMATION |

| 620 | RELEVANT LINK WILL BE ABLE TO BE UTILISED IN ORDER TO NOTIFY AN INTEREST IN SUBSCRIBER SHOWN |

| 625 | SOURCE 3RD PARTY LOCAL SEARCH ENGINES FOR ADDITIONAL BUSINESSES |

| 630 | ADDITIONAL BUSINESSES TO BE SHOWCASED ON MAPPING SERVER ALONGSIDE LOCAL INVESTMENTS RESULTS |

| 635 | ANY ADDITIONAL CONTACT AND COMMUNICATION BY SUBSCRIBERS TO BE STORED IN THE SYSTEM DATABASE |

FIG. 6

705
SYSTEM SOURCES 3^RD PARTY WEBSITES AND SEARCH ENGINES TO FIND SUGGESTED SERVICES
710
SUGGESTED LOCAL SERVICES SHOWCASED ON A MAPPING SERVER
715
SYSTEM SOURCES VARIOUS INVESTMENT AND 3^RD PARTY WEBSITES TO FIND MATCHING INVESTORS
720
SUGGESTED INVESTORS/ WEBSITE RESULTS PROVIDED
FIG. 7

905
LOCAL INVESTMENT CLUB PROVIDES ADDITIONAL INFORMATION
910
RESPONSIVE TEMPLATE CREATED AND ATTACHED TO GEOSPATIAL LOCATION
915
CLUB CURRENT AND POTENTIAL INVESTMENTS PROVIDED
920
GEOSPATIAL LOCATION IDENTIFIER PROVIDED FOR ALL SAID INVESTMENTS
925
VIDEO STREAMING LINK ATTACHED TO TEMPLATE
930
LINK ATTACHED TO TEMPLATE TO REQUEST TO BECOME A MEMBER
FIG. 9

1005

BUSINESS CONDUCTING PRE-SALES OR DPO PROVIDES ADDITIONAL INFORMATION

1010

RESPONSIVE TEMPLATE CREATED AND ATTACHED TO GEOSPATIAL LOCATION WITH SAID ADDITIONAL INFORMATION

1015

ADDITIONAL FILES UPLOADED AND ATTACHED TO TEMPLATE

1020

PAYMENT LINK ATTACHED TO TEMPLATE

1025

UPON PURCHASE/PAYMENT, SUBSCRIBER SENT RELEVANT DOCUMENTS

FIG. 10

SYSTEM, METHOD, AND PROGRAM PRODUCT FOR LOCAL INVESTMENT NETWORKING

CROSS-REFERENCE TO RELATED APPLICATIONS

The present continuation patent application claims priority benefit of the U.S. nonprovisional application for patent Ser. No. 16/122,851 entitled "System, Method, and Program Product for Local Investment Networking", filed on 5 Sep. 2018 under 35 U.S.C 111(a) and further claim benefit to the provisional application for patent Ser. No. 62/554,450 entitled "Method of Local Investment Networking Platform", filed on 5 Sep. 2017 under 35 U.S.C. 119(e). The contents of this related provisional application are incorporated herein by reference for all purposes to the extent that such subject matter is not inconsistent herewith or limiting hereof.

INCORPORATION BY REFERENCE OF SEQUENCE LISTING PROVIDED AS A TEXT FILE

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

BACKGROUND OF THE RELEVANT PRIOR ART

One or more embodiments of the invention generally relate to investments. More particularly, certain embodiments of the invention relates to a local investment platform.

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, an aspect of the prior art generally useful to be aware of is that in business, there are commonly so many players involved that it is difficult to keep track of who may offer what or be sure that you know of all opportunities available to you. Finding other investors who can help spread risk or could help mentor is typically difficult. Online, there are various tools for connecting investors but there is still room to improve these tools and customize them for a specific application such as in local investments. Current solutions offer help connecting distant investors with businesses, but they have yet to address the large sector of investments in local businesses. Using computers for automatically extracting roles and possible investor relationships that may be involved in local investments is typically a difficult task to do well. Local business investments are vital to many areas and also make it easier for investors to visit facilities and be more integral to their success, while at the same time bypassing Wall Street/distant investors. Current websites for connecting investors focus on non-local/geographic based business investments, not where all parties involved are found locally. Furthermore, current websites typically do not offer location-based searching. Furthermore still, current websites usually do not offer automated matching. Furthermore still, current websites do not invest in improving search results for local investments and improved services. Furthermore still, while local clubs may exist to help local investors meet, these commonly meet in person and are not computer module executed so there is relatively a lot of room for improvement of platforms for local investments.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which:

FIG. 6 is a flow chart illustrating an exemplary third component of the invention, in accordance with an embodiment of the invention;

FIG. 7 is a flow chart illustrating an exemplary control panel sourcing additions of the invention, in accordance with an embodiment of the invention;

FIG. 9 is a flow chart illustrating an exemplary third component of the invention, in accordance with an embodiment of the invention; and, FIG. 10 is a flow chart illustrating an exemplary control panel sourcing additions of the invention, in accordance with an embodiment of the invention.

Figure 1:
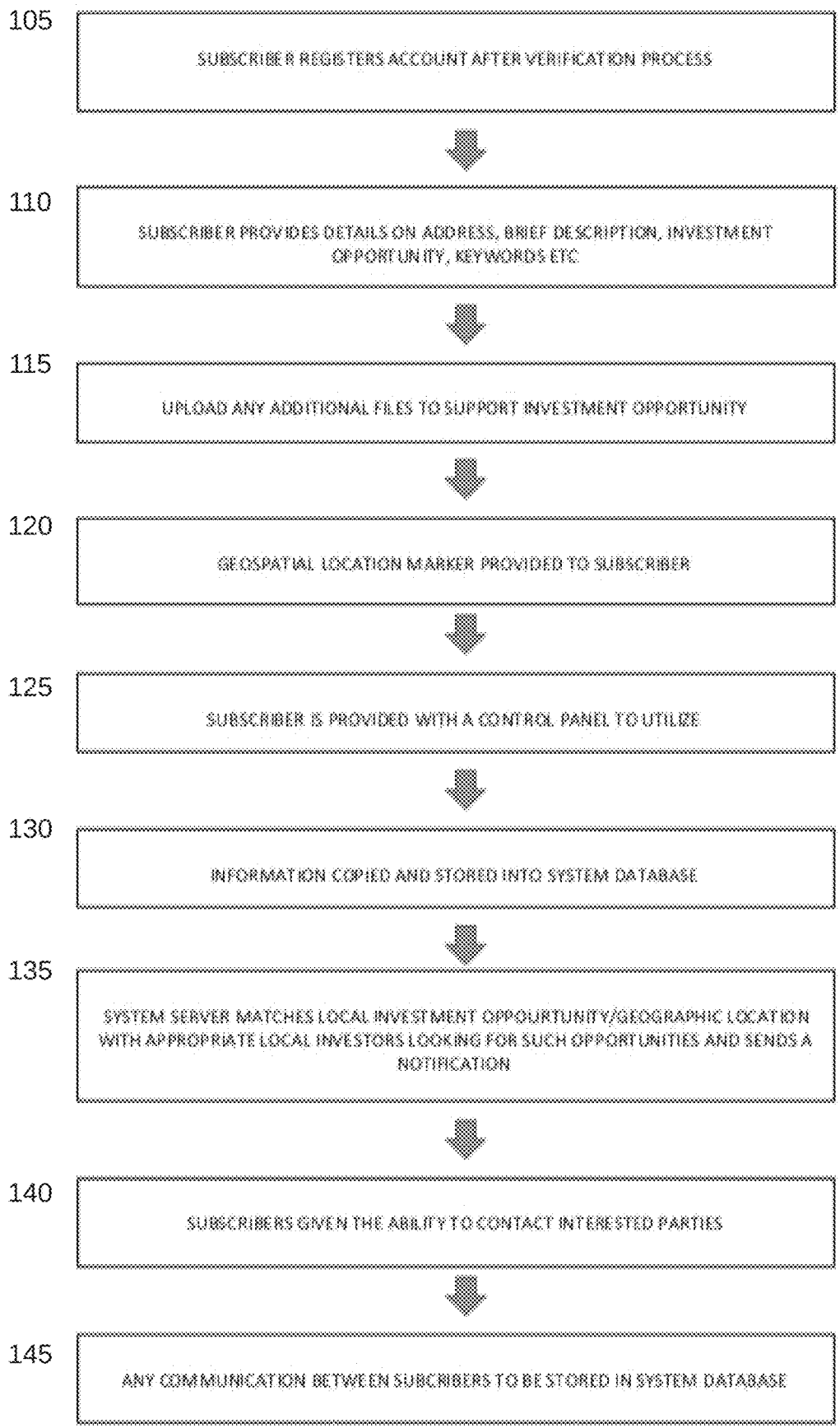
FIG. 1 is a flow chart illustrating an exemplary first component of the invention, in accordance with an embodiment of the invention.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc.

As will be established in some detail below, it is well settled law, as early as 1939, that words of approximation are not indefinite in the claims even when such limits are not defined or specified in the specification.

For example, see *Ex parte Mallory*, 52 USPQ 297, 297 (Pat. Off. Bd. App. 1941) where the court said "The examiner has held that most of the claims are inaccurate because apparently the laminar film will not be entirely eliminated. The claims specify that the film is "substantially" eliminated and for the intended purpose, it is believed that the slight portion of the film which may remain is negligible. We are of the view, therefore, that the claims may be regarded as sufficiently accurate."

Note that claims need only "reasonably apprise those skilled in the art" as to their scope to satisfy the definiteness requirement. See *Energy Absorption Sys., Inc. v. Roadway Safety Servs., Inc.*, Civ. App. 96-1264, slip op. at 10 (Fed. Cir. Jul. 3, 1997) (unpublished) *Hybridtech v. Monoclonal Antibodies, Inc.*, 802 F.2d 1367, 1385, 231 USPQ 81, 94 (Fed. Cir. 1986), cert. denied, 480 U.S. 947 (1987). In addition, the use of modifiers in the claim, like "generally" and "substantial," does not by itself render the claims indefinite. See *Seattle Box Co. v. Industrial Crating & Packing, Inc.*, 731 F.2d 818, 828-29, 221 USPQ 568, 575-76 (Fed. Cir. 1984).

Moreover, the ordinary and customary meaning of terms like "substantially" includes "reasonably close to: nearly, almost, about", connoting a term of approximation. See In re *Frye*, Appeal No. 2009-006013, 94 USPQ2d 1072, 1077, 2010 WL 889747 (B.P.A.I. 2010) Depending on its usage, the word "substantially" can denote either language of approximation or language of magnitude. *Deering Precision Instruments, L.L.C. v. Vector Distribution Sys., Inc.*, 347 F.3d 1314, 1323 (Fed. Cir. 2003) (recognizing the "dual ordinary meaning of th[e] term ["substantially"] as connoting a term of approximation or a term of magnitude"). Here, when referring to the "substantially halfway" limitation, the Specification uses the word "approximately" as a substitute for the word "substantially" (Fact 4). (Fact 4). The ordinary meaning of "substantially halfway" is thus reasonably close to or nearly at the midpoint between the forwardmost point of the upper or outsole and the rearwardmost point of the upper or outsole.

Similarly, the term 'substantially' is well recognize in case law to have the dual ordinary meaning of connoting a term of approximation or a term of magnitude. See *Dana Corp. v. American Axle & Manufacturing, Inc.*, Civ. App. 04-1116, 2004 U.S. App. LEXIS 18265, *13-14 (Fed. Cir. Aug. 27, 2004) (unpublished). The term "substantially" is commonly used by claim drafters to indicate approximation. See *Cordis Corp. v. Medtronic AVE Inc.*, 339 F.3d 1352, 1360 (Fed. Cir. 2003) ("The patents do not set out any numerical standard by which to determine whether the thickness of the wall surface is 'substantially uniform.' The term 'substantially,' as used in this context, denotes approximation. Thus, the walls must be of largely or approximately uniform thickness."); see also *Deering Precision Instruments, LLC v. Vector Distribution Sys., Inc.*, 347 F.3d 1314, 1322 (Fed. Cir. 2003); *Epcon Gas Sys., Inc. v. Bauer Compressors, Inc.*, 279 F.3d 1022, 1031 (Fed. Cir. 2002). We find that the term "substantially" was used in just such a manner in the claims of the patents-in-suit: "substantially uniform wall thickness" denotes a wall thickness with approximate uniformity.

It should also be noted that such words of approximation as contemplated in the foregoing clearly limits the scope of claims such as saying 'generally parallel' such that the adverb 'generally' does not broaden the meaning of parallel. Accordingly, it is well settled that such words of approximation as contemplated in the foregoing (e.g., like the phrase 'generally parallel') envisions some amount of deviation from perfection (e.g., not exactly parallel), and that such words of approximation as contemplated in the foregoing are descriptive terms commonly used in patent claims to avoid a strict numerical boundary to the specified parameter. To the extent that the plain language of the claims relying on such words of approximation as contemplated in the foregoing are clear and uncontradicted by anything in the written description herein or the figures thereof, it is improper to rely upon the present written description, the figures, or the prosecution history to add limitations to any of the claim of the present invention with respect to such words of approximation as contemplated in the foregoing. That is, under such circumstances, relying on the written description and prosecution history to reject the ordinary and customary meanings of the words themselves is impermissible. See, for example, *Liquid Dynamics Corp.* v. *Vaughan Co.*, 355 F.3d 1361, 69 USPQ2d 1595, 1600-01 (Fed. Cir. 2004). The plain language of phrase 2 requires a "substantial helical flow." The term "substantial" is a meaningful modifier implying "approximate," rather than "perfect." In *Cordis Corp.* v. *Medtronic AVE, Inc.*, 339 F.3d 1352, 1361 (Fed. Cir. 2003), the district court imposed a precise numeric constraint on the term "substantially uniform thickness." We noted that the proper interpretation of this term was "of largely or approximately uniform thickness" unless something in the prosecution history imposed the "clear and unmistakable disclaimer" needed for narrowing beyond this simple-language interpretation. Id. In *Anchor Wall Systems* v. *Rockwood Retaining Walls, Inc.*, 340 F.3d 1298, 1311 (Fed. Cir. 2003)" Id. at 1311. Similarly, the plain language of Claim 1 requires neither a perfectly helical flow nor a flow that returns precisely to the center after one rotation (a limitation that arises only as a logical consequence of requiring a perfectly helical flow).

The reader should appreciate that case law generally recognizes a dual ordinary meaning of such words of approximation, as contemplated in the foregoing, as connoting a term of approximation or a term of magnitude; e.g., see *Deering Precision Instruments, L.L.C.* v. *Vector Distrib. Sys., Inc.*, 347 F.3d 1314, 68 USPQ2d 1716, 1721 (Fed. Cir. 2003), cert. denied, 124 S. Ct. 1426 (2004) where the court was asked to construe the meaning of the term "substantially" in a patent claim. Also see *Epcon,* 279 F.3d at 1031 ("The phrase 'substantially constant' denotes language of approximation, while the phrase 'substantially below' signifies language of magnitude, i.e., not insubstantial."). Also, see, e.g., *Epcon Gas Sys., Inc.* v. *Bauer Compressors, Inc.*, 279 F.3d 1022 (Fed. Cir. 2002) (construing the terms "substantially constant" and "substantially below"); *Zodiac Pool Care, Inc.* v. *Hoffinger Indus., Inc.*, 206 F.3d 1408 (Fed. Cir. 2000) (construing the term "substantially inward"); *York Prods., Inc.* v. *Cent. Tractor Farm & Family Ctr.*, 99 F.3d 1568 (Fed. Cir. 1996) (construing the term "substantially the entire height thereof"); *Tex. Instruments Inc.* v. *Cypress Semiconductor Corp.*, 90 F.3d 1558 (Fed. Cir. 1996) (construing the term "substantially in the common plane"). In conducting their analysis, the court instructed to begin with the ordinary meaning of the claim terms to one of ordinary skill in the art. *Prima Tek,* 318 F.3d at 1148. Reference to dictionaries and our cases indicates that the term "substantially" has numerous ordinary meanings. As the district court stated, "substantially" can mean "significantly" or "considerably." The term "substantially" can also mean "largely" or "essentially." Webster's New 20th Century Dictionary 1817 (1983).

Words of approximation, as contemplated in the foregoing, may also be used in phrases establishing approximate ranges or limits, where the end points are inclusive and approximate, not perfect; e.g., see *AK Steel Corp.* v. *Sollac*, 344 F.3d 1234, 68 USPQ2d 1280, 1285 (Fed. Cir. 2003) where it where the court said [W]e conclude that the ordinary meaning of the phrase "up to about 10%" includes the "about 10%" endpoint. As pointed out by AK Steel, when an object of the preposition "up to" is nonnumeric, the most natural meaning is to exclude the object (e.g., painting the wall up to the door). On the other hand, as pointed out by Sollac, when the object is a numerical limit, the normal meaning is to include that upper numerical limit (e.g., counting up to ten, seating capacity for up to seven passengers). Because we have here a numerical limit—"about 10%"—the ordinary meaning is that that endpoint is included.

In the present specification and claims, a goal of employment of such words of approximation, as contemplated in the foregoing, is to avoid a strict numerical boundary to the modified specified parameter, as sanctioned by *Pall Corp.* v. *Micron Separations, Inc.*, 66 F.3d 1211, 1217, 36 USPQ2d 1225, 1229 (Fed. Cir. 1995) where it states "It is well established that when the term "substantially" serves reasonably to describe the subject matter so that its scope would be understood by persons in the field of the invention, and to distinguish the claimed subject matter from the prior art, it is not indefinite." Likewise see *Verve LLC* v. *Crane Cams Inc.*, 311 F.3d 1116, 65 USPQ2d 1051, 1054 (Fed. Cir. 2002). Expressions such as "substantially" are used in patent documents when warranted by the nature of the invention, in order to accommodate the minor variations that may be appropriate to secure the invention. Such usage may well satisfy the charge to "particularly point out and distinctly claim" the invention, 35 U.S.C. § 112, and indeed may be necessary in order to provide the inventor with the benefit of his invention. In *Andrew Corp.* v. *Gabriel Elecs. Inc.*, 847 F.2d 819, 821-22, 6 USPQ2d 2010, 2013 (Fed. Cir. 1988) the court explained that usages such as "substantially equal" and "closely approximate" may serve to describe the invention with precision appropriate to the technology and without intruding on the prior art. The court again explained in *Ecolab Inc.* v. *Envirochem, Inc.*, 264 F.3d 1358, 1367, 60 USPQ2d 1173, 1179 (Fed. Cir. 2001) that "like the term 'about,' the term 'substantially' is a descriptive term commonly used in patent claims to 'avoid a strict numerical boundary to the specified parameter, see *Ecolab Inc.* v. *Envirochem Inc.*, 264 F.3d 1358, 60 USPQ2d 1173, 1179 (Fed. Cir. 2001) where the court found that the use of the term "substantially" to modify the term "uniform" does not render this phrase so unclear such that there is no means by which to ascertain the claim scope.

Similarly, other courts have noted that like the term "about," the term "substantially" is a descriptive term commonly used in patent claims to "avoid a strict numerical boundary to the specified parameter."; e.g., see *Pall Corp.* v. *Micron Seps.*, 66 F.3d 1211, 1217, 36 USPQ2d 1225, 1229 (Fed. Cir. 1995); see, e.g., *Andrew Corp.* v. *Gabriel Elecs. Inc.*, 847 F.2d 819, 821-22, 6 USPQ2d 2010, 2013 (Fed. Cir. 1988) (noting that terms such as "approach each other," "close to," "substantially equal," and "closely approximate" are ubiquitously used in patent claims and that such usages, when serving reasonably to describe the claimed subject matter to those of skill in the field of the invention, and to distinguish the claimed subject matter from the prior art, have been accepted in patent examination and upheld by the courts). In this case, "substantially" avoids the strict 100% nonuniformity boundary.

Indeed, the foregoing sanctioning of such words of approximation, as contemplated in the foregoing, has been established as early as 1939, see *Ex parte Mallory,* 52 USPQ 297, 297 (Pat. Off. Bd. App. 1941) where, for example, the court said "the claims specify that the film is "substantially" eliminated and for the intended purpose, it is believed that the slight portion of the film which may remain is negligible. We are of the view, therefore, that the claims may be regarded as sufficiently accurate." Similarly, In re *Hutchison,* 104 F.2d 829, 42 USPQ 90, 93 (C.C.P.A. 1939) the court said "It is realized that "substantial distance" is a relative and somewhat indefinite term, or phrase, but terms and phrases of this character are not uncommon in patents in cases where, according to the art involved, the meaning can be determined with reasonable clearness."

Hence, for at least the forgoing reason, Applicants submit that it is improper for any examiner to hold as indefinite any claims of the present patent that employ any words of approximation.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will be described in detail below with reference to embodiments thereof as illustrated in the accompanying drawings.

References to a "device," an "apparatus," a "system," etc., in the preamble of a claim should be construed broadly to mean "any structure meeting the claim terms" exempt for any specific structure(s)/type(s) that has/(have) been explicitly disavowed or excluded or admitted/implied as prior art in the present specification or incapable of enabling an object/aspect/goal of the invention. Furthermore, where the present specification discloses an object, aspect, function, goal, result, or advantage of the invention that a specific prior art structure and/or method step is similarly capable of performing yet in a very different way, the present invention disclosure is intended to and shall also implicitly include and cover additional corresponding alternative embodiments that are otherwise identical to that explicitly disclosed except that they exclude such prior art structure(s)/step(s), and shall accordingly be deemed as providing sufficient disclosure to support a corresponding negative limitation in a claim claiming such alternative embodiment(s), which exclude such very different prior art structure(s)/step(s) way(s).

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" include the stated particular feature, structure, or characteristic.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred or induced by any pattern(s) of description, embodiments, examples, or referenced prior-art that may (or may not) be provided in the present patent.

References to "end user", or any similar term, as used herein, is generally intended to mean late stage user(s) as opposed to early stage user(s). Hence, it is contemplated that there may be a multiplicity of different types of "end user" near the end stage of the usage process. Where applicable, especially with respect to distribution channels of embodiments of the invention comprising consumed retail products/services thereof (as opposed to sellers/vendors or Original Equipment Manufacturers), examples of an "end user" may include, without limitation, a "consumer", "buyer", "customer", "purchaser", "shopper", "enjoyer", "viewer", or individual person or non-human thing benefiting in any way, directly or indirectly, from use of. or interaction, with some aspect of the present invention.

In some situations, some embodiments of the present invention may provide beneficial usage to more than one stage or type of usage in the foregoing usage process. In such cases where multiple embodiments targeting various stages of the usage process are described, references to "end user", or any similar term, as used therein, are generally intended to not include the user that is the furthest removed, in the foregoing usage process, from the final user therein of an embodiment of the present invention.

Where applicable, especially with respect to retail distribution channels of embodiments of the invention, intermediate user(s) may include, without limitation, any individual person or non-human thing benefiting in any way, directly or indirectly, from use of, or interaction with, some aspect of the present invention with respect to selling, vending, Original Equipment Manufacturing, marketing, merchandising, distributing, service providing, and the like thereof.

References to "person", "individual", "human", "a party", "animal", "creature", or any similar term, as used herein, even if the context or particular embodiment implies living user, maker, or participant, it should be understood that such characterizations are sole by way of example, and not limitation, in that it is contemplated that any such usage, making, or participation by a living entity in connection with making, using, and/or participating, in any way, with embodiments of the present invention may be substituted by such similar performed by a suitably configured non-living entity, to include, without limitation, automated machines, robots, humanoids, computational systems, information processing systems, artificially intelligent systems, and the like. It is further contemplated that those skilled in the art will readily recognize the practical situations where such living makers, users, and/or participants with embodiments of the present invention may be in whole, or in part, replaced with such non-living makers, users, and/or participants with embodiments of the present invention. Likewise, when those skilled in the art identify such practical situations where such living makers, users, and/or participants with embodiments of the present invention may be in whole, or in part, replaced with such non-living makers, it will be readily apparent in light of the teachings of the present invention how to adapt the described embodiments to be suitable for such non-living makers, users, and/or participants with embodiments of the present invention. Thus, the invention is thus to also cover all such modifications, equivalents, and alternatives falling within the spirit and scope of such adaptations and modifications, at least in part, for such non-living entities.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation. Each term utilized herein is to be given its broadest interpretation given the context in which that term is utilized.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A memory controller comprising a system cache . . . ." Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc.

Reciting that a mechanism/unit/circuit/component is "configured to" or "operable for" perform(ing) one or more tasks is expressly intended not to invoke 35 U.S.C. .sctn.112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" and "consisting of" limits the scope of a claim to the specified elements or method steps, plus those that do not materially affect the basis and novel characteristic(s) of the claimed subject matter (see *Norian Corp.* v *Stryker Corp.*, 363 F.3d 1321, 1331-32, 70 USPQ2d 1508, Fed. Cir. 2004). Moreover, for any claim of the present invention which claims an embodiment "consisting essentially of" or "consisting of" a certain set of elements of any herein described embodiment it shall be understood as obvious by those skilled in the art that the present invention also covers all possible varying scope variants of any described embodiment(s) that are each exclusively (i.e., "consisting essentially of") functional subsets or functional combination thereof such that each of these plurality of exclusive varying scope variants each consists essentially of any functional subset(s) and/or functional combination(s) of any set of elements of any described embodiment(s) to the exclusion of any others not set forth therein. That is, it is contemplated that it will be obvious to those skilled how to create a multiplicity of alternate embodiments of the present invention that simply consisting essentially of a certain functional combination of elements of any described embodiment(s) to the exclusion of any others not set forth therein, and the invention thus covers all such exclusive embodiments as if they were each described herein.

With respect to the terms "comprising," "consisting of," and "consisting essentially of," where one of these three terms is used herein, the disclosed and claimed subject matter may include the use of either of the other two terms. Thus in some embodiments not otherwise explicitly recited, any instance of "comprising" may be replaced by "consisting of" or, alternatively, by "consisting essentially of", and thus, for the purposes of claim support and construction for "consisting of" format claims, such replacements operate to create yet other alternative embodiments "consisting essentially of" only the elements recited in the original "comprising" embodiment to the exclusion of all other elements.

Moreover, any claim limitation phrased in functional limitation terms covered by 35 USC § 112(6) (post AIA 112(0) which has a preamble invoking the closed terms "consisting of," or "consisting essentially of," should be understood to mean that the corresponding structure(s) disclosed herein define the exact metes and bounds of what the so claimed invention embodiment(s) consists of, or consisting essentially of, to the exclusion of any other elements which do not materially affect the intended purpose of the so claimed embodiment(s).

Devices or system modules that are in at least general communication with each other need not be in continuous communication with each other, unless expressly specified otherwise. In addition, devices or system modules that are in at least general communication with each other may communicate directly or indirectly through one or more intermediaries. Moreover, it is understood that any system components described or named in any embodiment or claimed herein may be grouped or sub-grouped (and accordingly implicitly renamed) in any combination or sub-combination as those skilled in the art can imagine as suitable for the particular application, and still be within the scope and spirit of the claimed embodiments of the present invention. For an example of what this means, if the invention was a controller of a motor and a valve and the embodiments and claims articulated those components as being separately grouped and connected, applying the foregoing would mean that such an invention and claims would also implicitly cover the valve being grouped inside the motor and the controller being a remote controller with no direct physical connection to the motor or internalized valve, as such the claimed invention is contemplated to cover all ways of grouping and/or adding of intermediate components or systems that still substantially achieve the intended result of the invention.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

Those of skill in the art will appreciate that where appropriate, some embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Where appropriate, embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

"Software" may refer to prescribed rules to operate a computer. Examples of software may include: code segments in one or more computer-readable languages; graphical and or/textual instructions; applets; pre-compiled code; interpreted code; compiled code; and computer programs.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software program code for carrying out operations for aspects of the present invention can be written in any combination of one or more suitable programming languages, including an object oriented programming languages and/or conventional procedural programming languages, and/or programming languages such as, for example, Hyper text Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Smalltalk, Perl, UNIX Shell, Visual Basic or Visual Basic Script, Virtual Reality Markup Language (VRML), ColdFusion™ or other compilers, assemblers, interpreters or other computer languages or platforms.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers (e.g., website owners or operators) place multimedia information (e.g., text, graphics, audio, video, animation, and other forms of data) at specific locations on the Internet referred to as webpages. Websites comprise a collection of connected, or otherwise related, webpages. The combination of all the websites and their corresponding webpages on the Internet is generally known as the World Wide Web (WWW) or simply the Web.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically a processor (e.g., a microprocessor) will receive instructions from a memory or like device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, removable media, flash memory, a "memory stick", any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Where databases are described, it will be understood by one of ordinary skill in the art that (i) alternative database structures to those described may be readily employed, (ii) other memory structures besides databases may be readily employed. Any schematic illustrations and accompanying descriptions of any sample databases presented herein are exemplary arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, an object-based model could be used to store and manipulate the data types of the present invention and likewise, object methods or behaviors can be used to implement the processes of the present invention.

A "computer system" may refer to a system having one or more computers, where each computer may include a computer-readable medium embodying software to operate the computer or one or more of its components. Examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hardwired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, or the like), but should be broadly construed to refer to any client-side rendering engine that can access and display Internet-accessible resources. A "rich" client typically refers to a non-HTTP based client-side application, such as an SSH or CFIS client. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Any application or functionality described herein may be implemented as native code, by providing hooks into another application, by facilitating use of the mechanism as a plug-in, by linking to the mechanism, and the like.

Exemplary networks may operate with any of a number of protocols, such as Internet protocol (IP), asynchronous transfer mode (ATM), and/or synchronous optical network (SONET), user datagram protocol (UDP), IEEE 802.x, etc.

Embodiments of the present invention may include apparatuses for performing the operations disclosed herein. An apparatus may be specially constructed for the desired purposes, or it may comprise a general-purpose device selectively activated or reconfigured by a program stored in the device.

Embodiments of the invention may also be implemented in one or a combination of hardware, firmware, and software. They may be implemented as instructions stored on a machine-readable medium, which may be read and executed by a computing platform to perform the operations described herein.

More specifically, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the following description and claims, the terms "computer program medium" and "computer readable medium" may be used to generally refer to media such as, but not limited to, removable storage drives, a hard disk installed in hard disk drive, and the like. These computer program products may provide software to a computer system. Embodiments of the invention may be directed to such computer program products.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Additionally, the phrase "configured to" or "operable for" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium.

Combinations of the above should also be included within the scope of the computer-readable media.

While a non-transitory computer readable medium includes, but is not limited to, a hard drive, compact disc, flash memory, volatile memory, random access memory, magnetic memory, optical memory, semiconductor based memory, phase change memory, optical memory, periodically refreshed memory, and the like; the non-transitory computer readable medium, however, does not include a pure transitory signal per se; i.e., where the medium itself is transitory.

An embodiment of the present invention may provide an improved search and connection of local investors and local investment opportunities using geospatial technologies with a potential for global reach. A local investment network platform may be based on location and use crowdsource funding. In one embodiment, the system may provide both a global and a consolidator of all investments that may be found on all the different types of crowdfunding sites, with the method being used to consolidate all such sites and investments will be by way of geospatial processes. By utilizing such processes, and unlike standard crowdfunding approaches, an investor may directly be dealing with and investing into the business that they may be communicating with. This crowdfunding module may carry out a method of consolidating potential investors and combining their investments to complete a goal investment amount The system may provide a method and platform that will be able to consolidate the entire crowdfunding industry, potentially having all investment opportunities, fundraising opportunities etc. to be able to be found, when searched for, from anywhere in the globe, with the result showcasing the geospatial location of the opportunity. This may allow for search and connection of local investors and local investment opportunities using geospatial technologies with a potential for global reach. Helping local investors connect with each other may allow an investment process to be streamlined by having all of an investment process done locally where an investor may visit companies and test out their products etc. more easily. Furthermore, this may benefit investors, local businesses, entrepreneurs, and start-ups looking for funding in this same way, as many such businesses are ineligible to get loans by standard means available by allowing them to bypass big banks and other standard means for getting investment loans. Furthermore still, investor relationship building may be streamlined when those involved are local. Furthermore still, a platform may allow users to sell shares of investments to other investors which would be relatively well suited to take over. Furthermore still, this platform may simplify results for users by offering an easy to use interface and using automated geospatial mapping and search modules. Furthermore still, this may help automate compliance with financial laws. Furthermore still, product or concept showcasing may be available for simplified distribution to local investors. Furthermore still, a platform may provide a plurality notifications for alerting users of any related process. Furthermore still, this may help local charities or local small loan lending. Furthermore still, with improved data analysis, interfacing, and user interface, this platform may significantly improve local investing.

In one embodiment, a crowdfunding $3^{rd}$ party website (this could be either an investment based crowdfunding site, a rewards based crowdfunding site, a donations based crowdfunding site etc.) may utilize the control panel to provide information to the system about one or more of its clients investment opportunities that are advertised on their website, which they will select to be added to the platform. Such information is only a general summary at this point (i.e. business name, address, amount they are looking to raise). A crowdfunding site may also provide a website link to their clients advertisement on their site. This link may be the direct link to where such an opportunity is directly located on the crowdfunding sites website, which will be displayed at the geospatial location of the advertisement and may be clicked on to send a searcher directly to the crowdfunding site.

In some embodiments, the geospatial location marker may be provided to the crowdfunding investment opportunity uploaded by the crowdfunding site, along with having the above information attached to such a location. The geospatial location marker may be in the location address that is provided by the crowdfunding site for the investment. A responsive template may be created and attached to the geospatial location in order to display more information that will be able to be viewed on multiple computing devices. A separate template may be created for each investment uploaded by the crowdfunding site. The crowdfunding site may provide additional information. Such additional information may range from a further in depth description, attachment of pictures, and also attachments of videos, all to support the opportunity, which may be displayed on the responsive template. A crowdfunding party may be given the ability to chose whether they want the information displayed to be translated into different languages. This may provide the ability for such investments/donation opportunities etc. to be showcased to users around the world in multiple languages.

In other embodiments, a translation of selected template information into a selected language to be done by direct human translation or by utilizing one or more hardware processors and databases, along with one or more artificial intelligence language translation services. A payment method to be attached to the responsive template may link directly to the crowdfunding sites payment account. This may provide the advantage of being able to make donations to countries that wouldn't be possible without the language translation in many cases. A $3^{rd}$ party crowdfunding site may provide a template on its websites homepage showcasing all of its clients uploaded investments, along with their precise geospatial location markers, on a mapping server. The template may be able to be clicked on by a user to direct them to the platform. For instance, if an investment based crowdfunding site uploads 50 of the investment opportunities it has on its website, all such investments location may be showcased on the mapping server by way of geospatial identifiers. The system may act as a global consolidator to the crowdfunding industry. It will allow all the different crowdfunding platforms to showcase and list (if they would like to) all of the available crowdfunding type of opportunities that they have listed on their websites, which can then be found and accessed through geospatial search processes. This method will also be able to be done for the classified ads industry, to consolidate such by way of geospatial methods.

In an alternative embodiment, the crowdfunding industry could be consolidated by way of vertical search engines that would crawl through the numerous crowdfunding websites worldwide and showcase the relevant results. Once the relevant results are showcased, a user could click on the add and then be directed to the crowdfunding site. Also, the results page may integrate Google Maps in order to geolocate the address of relevant ads showcased.

FIG. 1 is a flow chart illustrating an exemplary first component of the invention, in accordance with an embodiment of the invention. FIG. 1 steps could be done by having a subscriber register onto the platform and have their details showcased on a tile type of display under certain categories. Matching could then occur by categories and keywords, whilst the geospatial location of the investment/opportunity etc. could be showcased on the tile display and would be able to be found/seen from there. In a Step 105 a subscriber (entrepreneur, inventor, local investment club, local investment opportunity, local investor etc. may go through a verification process in order to register onto a platform. Subscribers ma further include: Property Developers, Local Farmers, Local Incubators, Local Community Banks, Local Credit Unions, Community Development Finance Institutions, Microlending organizations to low-income recipients, Not-for-Profits, Social Impact Investors, Program Related-Investors, Community Supported Agriculture Groups, Local economic development agencies, Local and Municipal Councils, Business Development Companies, Local Investment Networks. A LOCAL INVESTMENT OPPORTUNITY may include, but not limited to, businesses looking to raise capital, businesses looking to finance new stores or upgrade equipment, businesses offering Direct Public Offerings, Businesses conducting Pre-Sales to raise money, Housing Projects. INVESTMENT FUNDS/INVESTORS may include but not limited to Local Investment Funds, Regional Investment Funds, State Investment Funds, Mutual Funds, Pension Funds, Accredited Investors, Sophisticated Investors, Angel Investors, Private Equity Groups, Venture Capitalists, Foreign Investors. $3^{rd}$ PARTY CROWDFUNDING SITES may include sites such as Zopa, Kiva, Kickstarter etc., to be utilized in order to increase the exposure of the listed opportunities from their websites on a global geospatial based platform. $3^{rd}$ PARTY INVESTMENT PORTALS may include current website portals that cater for angel and accredited investors, such as Angel List, could utilize the platform in order to be able to increase the exposure of their clients investment opportunities posted on their sites in a geospatial manner globally. In a Step 110 a subscriber may provide additional details such as address, description of local investment club, a brief description of a local investment opportunity, a title for a local investment offer, local investments sought by investors etc, along with choosing appropriate keywords in a system in regards to a local investment opportunity or local investment sought. Subscribers may also input how much investment they are seeking to raise by selected means such as equity raise, debt, pre-sale etc, A subscriber could also indicate how much they are looking to invest, to which the sum inputted could be for a one off investment or multiple amounts could be provided for different industries that are sought for investment, and a subscriber could also input how much they are considering investing, along with the industries they are looking at investing in. In a Step 115 additional files may be uploaded to support subscribers. In a case of a local investment opportunity, it may be files including information on a business concept, patents for sale, business plan, financial forecasts etc. Additional files to be uploaded could include Vision and Mission, Opportunities and Challenges, details on any securities that may be offered ie. Type, equity, debt, revenue share etc., entity type, industry, product, legal info, team members, stage of development, traction details, proposed used of funds sought, financials of the business, investor pitch deck, fundraising structure and terms, electronic signature forms, and details on investors that may be eligible such as all investors, accredited investors, and the amount of investors sought. The team members of the business can also upload additional information in regards to details about past businesses they have run, or past businesses they have sold or were involved with. In a case of a local investment club, it may be information on an investment style and members of a club. In a case of an investor, it may be details of a local investment an investor may have shares in and may be looking to sell (where a place that local shares may be advertised may be subject to another invention), evidence of previous successful investments, qualifications, experience, etc. For a local investment club, additions could include the Mission Statement, Industries focused on, Rules of the Club, and Directors/Senior Manager information. For an investor, additions could include educational background, evidence of distribution partners, product or industry experience, evidence of executive experience, and details of the ability to access talent in order to be able to scale teams. In a Step 120, a geospatial location marker/identifier may be given to a subscriber in order to provide a geographic location of a local investment opportunity, local investor, or local investment club. In a Step 125 a subscriber may then be given a user control panel which they may be able to utilize to change information, add additional uploads, conduct searches, etc. As detailed in another figure below, a subscriber may also be able to request information on local services they would like such as accountants, advisors, and lawyers, and have all such sourced from $3^{rd}$ party search engines and showcased on a geospatial mapping server. In addition, through the control panel a subscriber would be able to request information regarding certain regulations, courses, mentorship, how to write a business plan, capital raising methods, learning basic business and accounting skills, which will be sourced from $3^{rd}$ party search engines, with the results provided in a tabular form in the control panel. In a Step 130 all information collected may be stored into a systems database. In a Step 135 a system server may automatically match subscribers according to appropriate keywords and geospatial locations. In addition, the system may also be automatically matched in regards to the investment amount sought, along with the amount an investor is looking to invest, or is considering investing, and the specific industry/s the investment is in, and is being sought for by an investor. This addition was added above. (for example a local investor looking for certain local investment opportunities may be matched with an appropriate local investment opportunity available according to keywords and geographic location sought, specified financial amounts (ie. Investment sought/amount willing to invest etc.), local investors looking for secondary shares of local businesses being sold in certain geographic areas may be notified of shares in local businesses becoming available, local investors may be notified of local investment clubs in their geographic region etc. Local entrepreneurs may be able to be matched with Local community Banks, Local Credit Unions, or Community Development Finance Institutions etc., Low-Income individuals may be matched with Microlending organizations that cater to low income recipients etc., Local Farmers may be able to be matched to Community Supported Agriculture Groups or Local Economic Development Agencies etc., Inventors could be matched with Local Incubators etc., and all subscribers that provides some type of debt facilities could be matched with appropriate subscribers seeking some type of debt financing etc.). A system may then send out an automated notification to advise subscribers of such. In a Step 140 notified parties may then be able to contact appropriate interested subscribers through way of messages or email in a system in order to establish communication. The system may achieve this step by utilizing one or more hardware processors, databases, and network components. In a Step 145 any further communication that may take place between matched parties may be stored in a system database. Such information may be able to be utilized by all parties in order to show that relationships may have been established. No transactions may be able to occur through (i.e No transactions will be able to be undertaken in the system in regards to general investment advertisements. In regards to Direct Public Offerings and Pre-Sales (detailed below) transactions can occur) a system but there may be related information tracked and results generated by the system.

Figure 2:
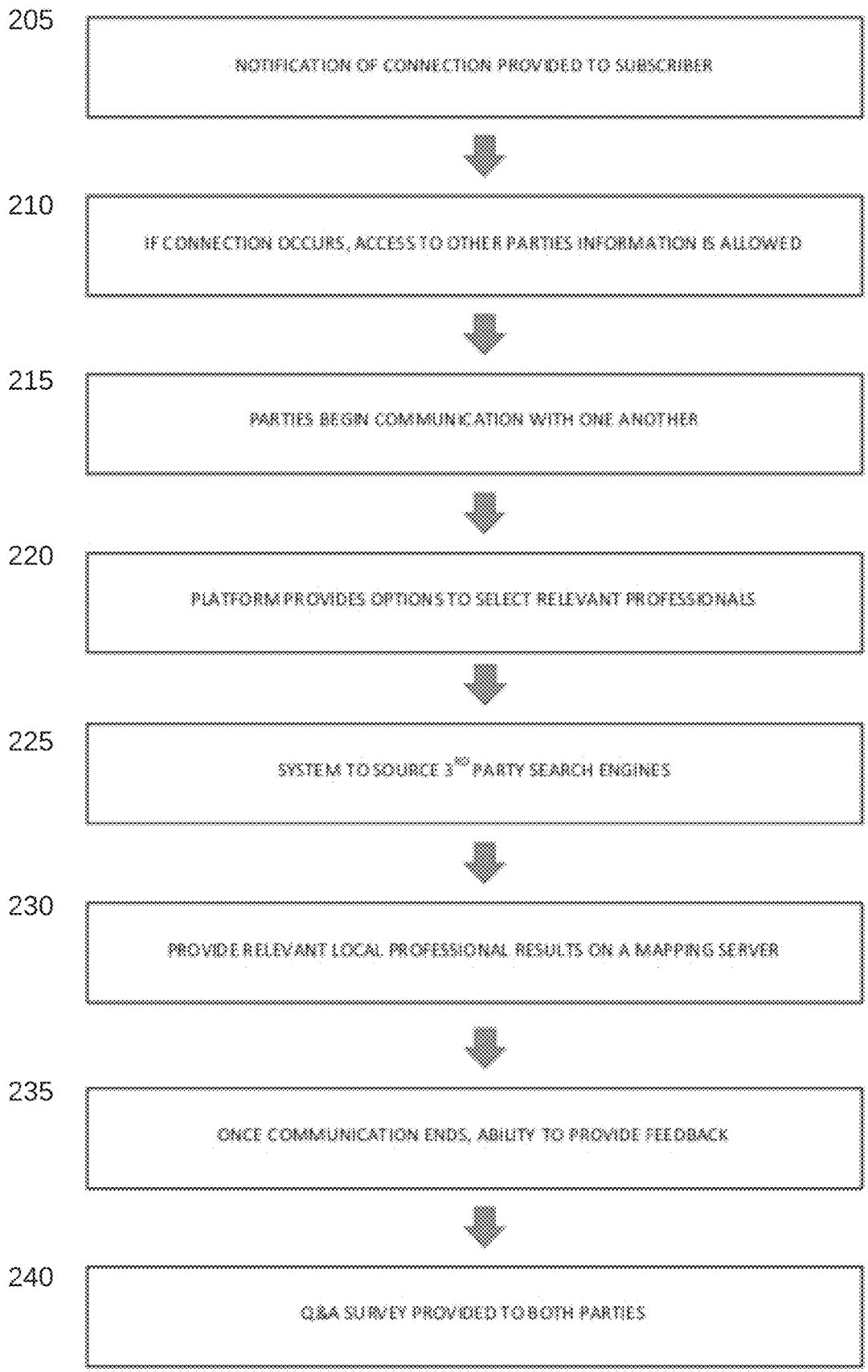
FIG. 2 is a flow chart illustrating an exemplary second component of the invention, in accordance with an embodiment of the invention.

FIG. 2 is a flow chart illustrating an exemplary second component of the invention, in accordance with an embodiment of the invention. In a Step 205 a subscriber may be able to navigate a search panel in order to input various keywords or categories of a type of opportunities they may be looking for (i.e. a local investor may be looking for local plumbing investment opportunities in a certain area). They may also include an area in which they may be looking for such opportunities, be it information including but not limited to zip code, local municipality, state, country, device location, or GPS applications. Alternatively, a category list could be provided, along with appropriate filters, in order to be able to choose what type of investment etc. is being sought. Search will also be able to be filtered by way of investment type ie. Debt, equity, pre-sales, DPO, or revenue sharing, donation based, rewards based etc. Search will also be able to utilize a filter to search for Local Investment Clubs, along with the industry/s they are focusing on and the member numbers the club is capped to, and will provide the relevant results on a geospatial mapping server. The system may store all searches in a databases in order to provide data analytics results in regards to measuring investor demand for certain industries and locations, and investment 'hot spots' by way of geospatial location due to all searches conducted. Data may also be able to be provided and extracted as to the average amount investors are willing to invest by way of location and industry (the system may be able to calculate all investors and amount they are willing to invest in order to come up with an average that each region/suburb may be looking to invest as an average). The system may also be able to utilize all search data done by subscribers in order to utilize algorithms in order to automatically showcase potential investments that a subscriber may be interested in. Also, the system may utilize all inputted investment criteria's, whether finance being sought by a business or investment opportunities being sought by an investor, and may utilize machine learning methods to provide a link to relevant securities laws or information that may be useful to such parties. In a Step 210 a mapping server may be displayed showing all relevant opportunities according to keywords and geographic area specified. All such results may be displayed using geospatial markers/identifiers in order to allow the user to know where the opportunity may be located. (This could also be done by displaying a mapping server, and then all relevant search results in a tile like format, and then once an investment or tile is selected, the location of the investment could then be showcased on the geospatial mapping server.) In a Step 220 additional information may be displayed to a user upon clicking on a certain geospatial marker/identifier of interest (This can be done utilizing a tile format and clicking on the tile, as described above). A user may be able to conduct such searches through mobile phones, tablets, desktops, smart watches, vehicle interfacing, or by way of smart home devices, and have all the relevant results showcased by way of mapping server on all said devices that were used. Such information may be include things such as but not limited to additional details to an investment opportunity, investor information etc. In a Step 225 a platform may allow a link to be utilized on additional information displayed which may allow interested parties to send notifications to each other in order to establish communication if there may be further interest shown by a recipient party. In a Step 230 any additional communication may be stored in a system database. A platform may also allow for payment system facilities to be included for a user to pay an appropriate amount for subscription fees, investor matching etc. Machine learning methods may utilize data stored from communications between parties to be able to provide relevant automated suggestions to subscribers as to investments/investors they may want to make communication with, or may be interested in. Data saved and analyzed may also then be able to inform other businesses/investors of the percentage of negotiations/communication that a subscriber was involved with ended well or poorly. This could then help a subscriber to decide whether they would like to initiate communication with a contact that was matched further, or not to bother going ahead with further communication. A platform may also allow for searches to be conducted in multiple languages, which in effect may allow discovery of local investments by international investors to be made more easily. Subscribers may also be able to cancel their accounts from a platform for whatever reason they deem to be appropriate. Reasons could include investments being completed, investments offers being withdrawn, or simply due to subscriber wishing to cancel their registration.

Figure 3:
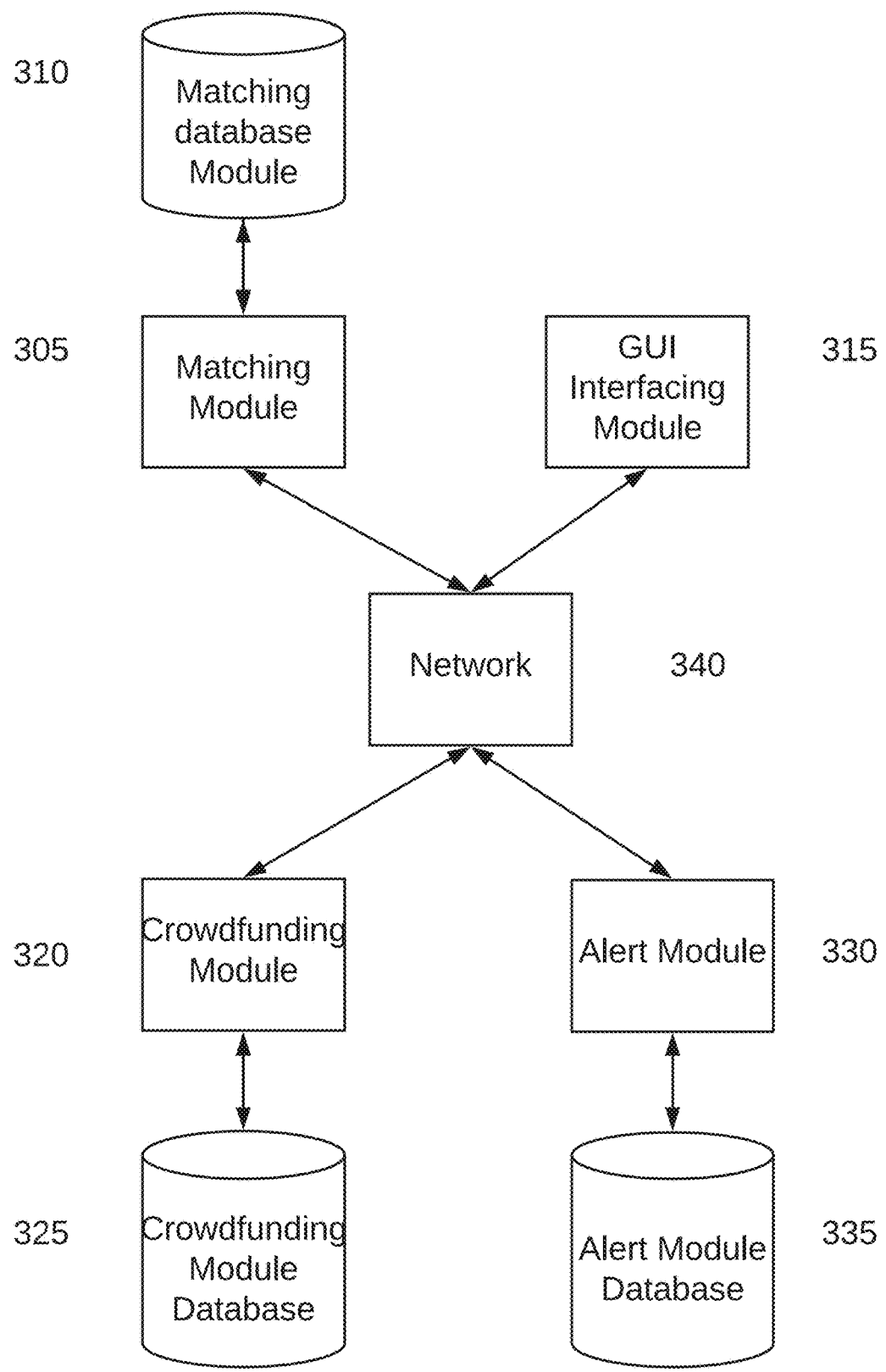
FIG. 3 is a block diagram illustrating an exemplary software modules' system.

FIG. 3 is a block diagram illustrating an exemplary Software Modules' System. In one embodiment, the system could use spatial algorithm processes in order to make matches by utilizing the geospatial marker locations. Within a Software Modules' System there may be a Matching Module 305 which may consist of storing locations corresponding to user/entity within a searchable Matching Database Module 310 which may be accessible through a network. Having data/metadata in this form may allow a matching process to quickly pull out results based on location. This data may be stored and processed in a databases including but not limited to MongoDB, SQL, NoSQL, etc. in order to allow complex searching and experimentation to improve search results and data analysis. Furthermore, there may be several ways for a Matching Module 305 to provide location based information using data mining and neural/learning based analysis. Once a matching processing may be completed, results may be presented to a user through various means including but not limited to GUI's, notifications, reports, statistical graphics, Table of List, Facetal Navigation, etc. An exemplary matching module may then use a user GUI Interfacing Module 315 in a form of a webpage or application. These may be built using languages including but not limited to Javascript, Java, C, Python, Swift, CSS, C++, C#, PHP, Pearl, Ruby, Rust, Elixir, Scala, R, Shell, Objective C, HTML, Dynamic HTML, XML, XSL, WML, VRML, etc. depending on an application or processing needed. In an exemplary embodiment a Matching Module 305 may also use a location's metadata to find corresponding area codes or county names or neighboring areas to further find location relevant results. In an exemplary embodiment a matching process may also use an API to interface with location-based metadata databases and data mining services. In an exemplary embodiment a Crowdfunding Module 320 may also process relevant data to automatically gather investment money and have all the relevant data accessible. The Crowdfunding Module 320 may use a Crowdfunding Module Database 325 to store and process data. The crowdfunding module may gather relatively small amounts of money from investors and combine that to give a business a larger investment overall. A local business investment platform may further use an Alert Module 330 which may track data analysis or transactions and alert users by interfacing with a mobile phone or email system. The alerting module may have an Alert Module Database 335 with methods for data analysis and alert rules storage, and the alerting module may be updated and improved. In an exemplary embodiment, these modules may utilize a Network 340 including but not limited to Wi-Fi, cellular, fiber optics, or ad-hoc, and this invention may utilize common hardware such as but not limited to mobile phones, tablets, desktops, smart watches, sound interfacing recorders/processors, image interfacing recorders/processors, vehicle interfacing, or smart home devices.

There may be additional modules utilized to implement the invention including but not limited to authentication modules, additional graphical interface modules, protocol processing modules for transferring data, system database data mining module, messaging modules, message/interaction tracking modules, alerting modules, communication allowance modules, location tracking based alerts.

Figure 4:
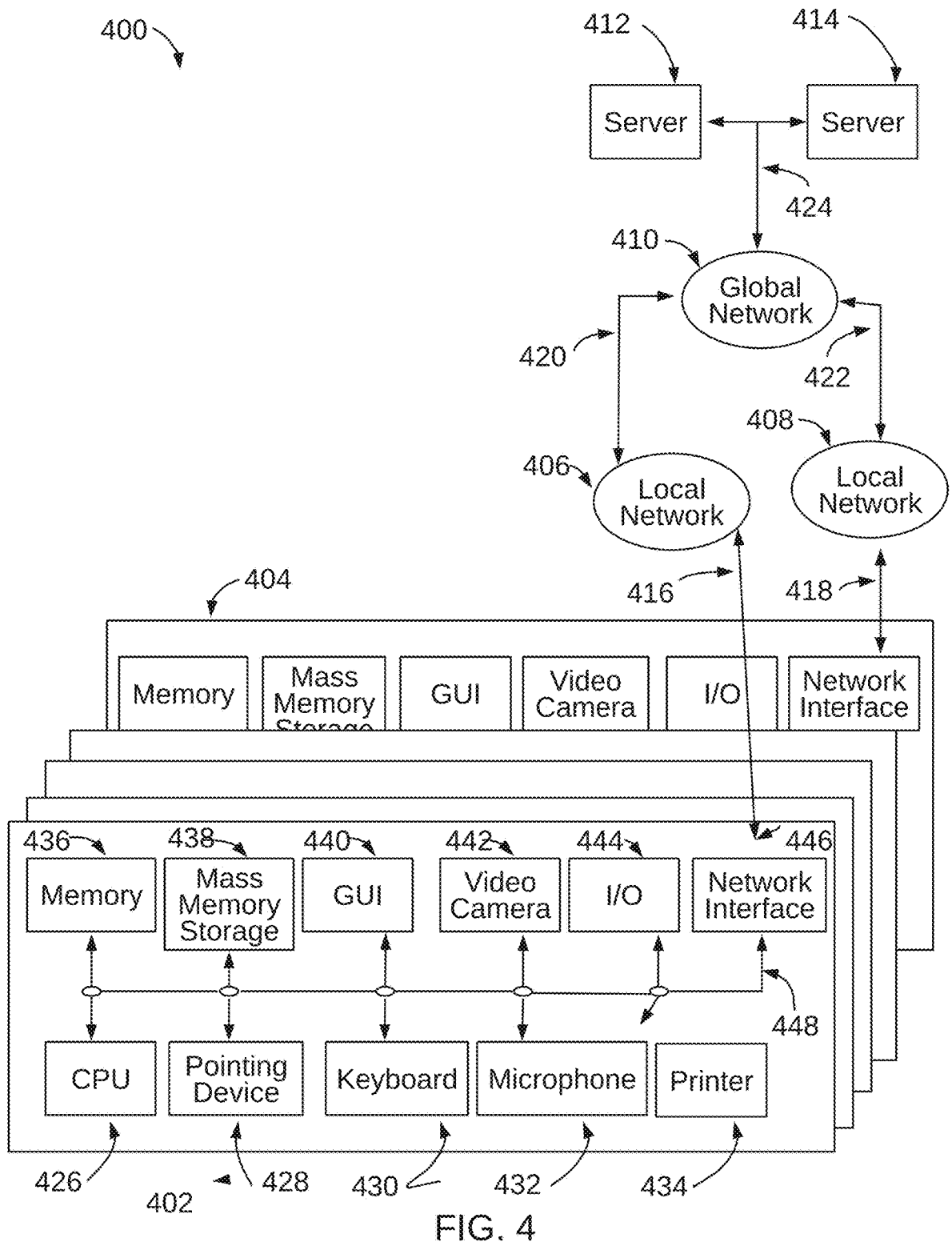
FIG. 4 is a block diagram depicting an exemplary client/server system which may be used by an exemplary web-enabled/networked embodiment of the present invention.

FIG. 4 is a block diagram depicting an exemplary client/server system which may be used by an exemplary web-enabled/networked embodiment of the present invention.

A communication system 400 includes a multiplicity of clients with a sampling of clients denoted as a client 402 and a client 404, a multiplicity of local networks with a sampling of networks denoted as a local network 406 and a local network 408, a global network 410 and a multiplicity of servers with a sampling of servers denoted as a server 412 and a server 414.

Client 402 may communicate bi-directionally with local network 406 via a communication channel 416. Client 404 may communicate bi-directionally with local network 408 via a communication channel 418. Local network 406 may communicate bi-directionally with global network 410 via a communication channel 420. Local network 408 may communicate bi-directionally with global network 410 via a communication channel 422. Global network 410 may communicate bi-directionally with server 412 and server 414 via a communication channel 424. Server 412 and server 414 may communicate bi-directionally with each other via communication channel 424. Furthermore, clients 402, 404, local networks 406, 408, global network 410 and servers 412, 414 may each communicate bi-directionally with each other.

In one embodiment, global network 410 may operate as the Internet. It will be understood by those skilled in the art that communication system 400 may take many different forms. Non-limiting examples of forms for communication system 400 include local area networks (LANs), wide area networks (WANs), wired telephone networks, wireless networks, or any other network supporting data communication between respective entities.

Clients 402 and 404 may take many different forms. Non-limiting examples of clients 402 and 404 include personal computers, personal digital assistants (PDAs), cellular phones and smartphones.

Client 402 includes a CPU 426, a pointing device 428, a keyboard 430, a microphone 432, a printer 434, a memory 436, a mass memory storage 438, a GUI 440, a video camera 442, an input/output interface 444 and a network interface 446.

CPU 426, pointing device 428, keyboard 430, microphone 432, printer 434, memory 436, mass memory storage 438, GUI 440, video camera 442, input/output interface 444 and network interface 446 may communicate in a unidirectional manner or a bi-directional manner with each other via a communication channel 448. Communication channel 448 may be configured as a single communication channel or a multiplicity of communication channels.

CPU 426 may be comprised of a single processor or multiple processors. CPU 426 may be of various types including micro-controllers (e.g., with embedded RAM/ROM) and microprocessors such as programmable devices (e.g., RISC or SISC based, or CPLDs and FPGAs) and devices not capable of being programmed such as gate array ASICs (Application Specific Integrated Circuits) or general purpose microprocessors.

As is well known in the art, memory 436 is used typically to transfer data and instructions to CPU 426 in a bi-directional manner. Memory 436, as discussed previously, may include any suitable computer-readable media, intended for data storage, such as those described above excluding any wired or wireless transmissions unless specifically noted. Mass memory storage 438 may also be coupled bi-directionally to CPU 426 and provides additional data storage capacity and may include any of the computer-readable media described above. Mass memory storage 438 may be used to store programs, data and the like and is typically a secondary storage medium such as a hard disk. It will be appreciated that the information retained within mass memory storage 438, may, in appropriate cases, be incorporated in standard fashion as part of memory 436 as virtual memory.

CPU 426 may be coupled to GUI 440. GUI 440 enables a user to view the operation of computer operating system and software. CPU 426 may be coupled to pointing device 428. Non-limiting examples of pointing device 428 include computer mouse, trackball and touchpad. Pointing device 428 enables a user with the capability to maneuver a computer cursor about the viewing area of GUI 440 and select areas or features in the viewing area of GUI 440. CPU 426 may be coupled to keyboard 430. Keyboard 430 enables a user with the capability to input alphanumeric textual information to CPU 426. CPU 426 may be coupled to microphone 432. Microphone 432 enables audio produced by a user to be recorded, processed and communicated by CPU 426. CPU 426 may be connected to printer 434. Printer 434 enables a user with the capability to print information to a sheet of paper. CPU 426 may be connected to video camera 442. Video camera 442 enables video produced or captured by user to be recorded, processed and communicated by CPU 426.

CPU 426 may also be coupled to input/output interface 444 that connects to one or more input/output devices such as such as CD-ROM, video monitors, track balls, mice, keyboards, microphones, touch-sensitive displays, transducer card readers, magnetic or paper tape readers, tablets, styluses, voice or handwriting recognizers, or other well-known input devices such as, of course, other computers.

Finally, CPU 426 optionally may be coupled to network interface 446 which enables communication with an external device such as a database or a computer or telecommunications or internet network using an external connection shown generally as communication channel 416, which may be implemented as a hardwired or wireless communications link using suitable conventional technologies. With such a connection, CPU 426 might receive information from the network, or might output information to a network in the course of performing the method steps described in the teachings of the present invention.

Figure 5:
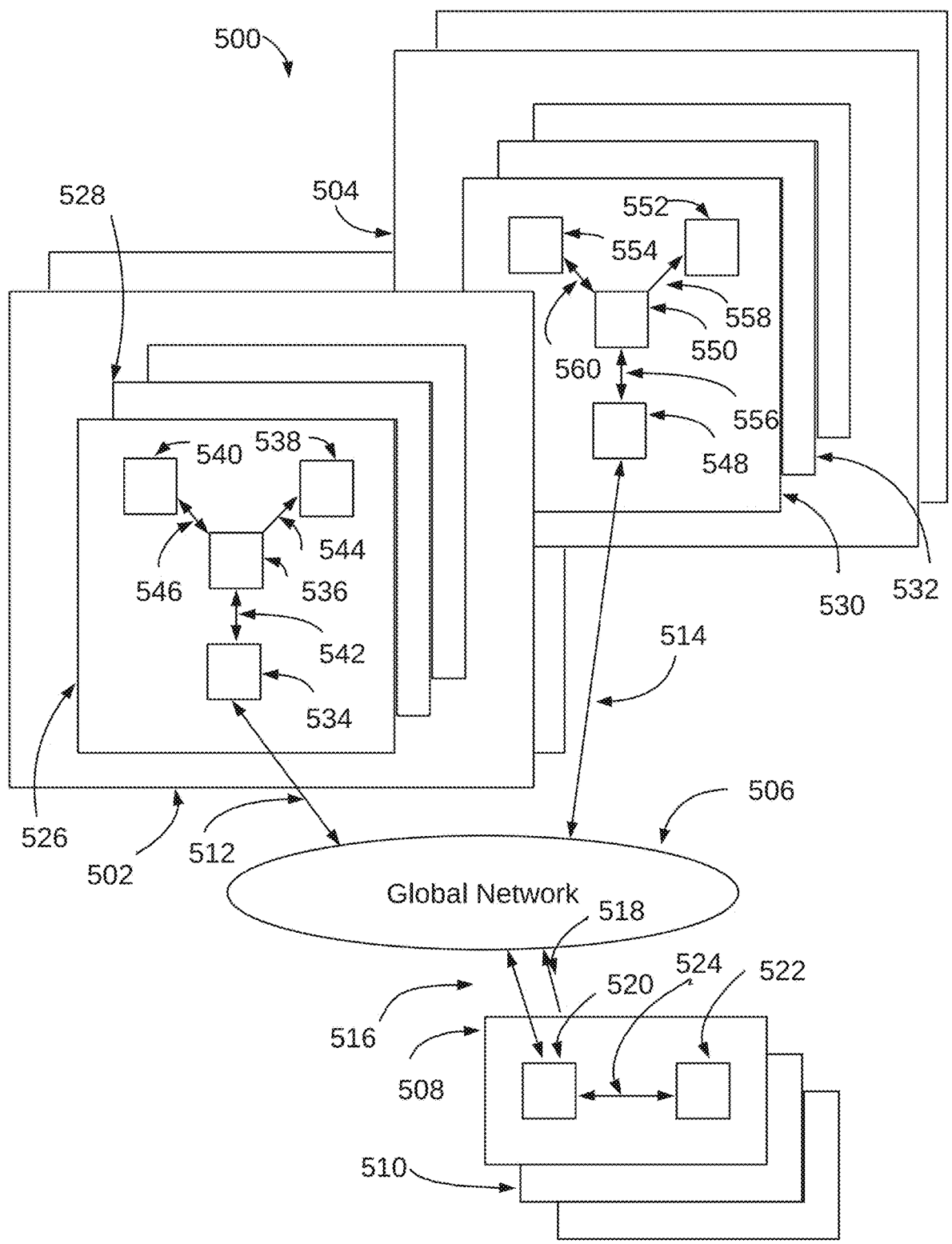
FIG. 5 illustrates a block diagram depicting a conventional client/server communication system, which may be used by an exemplary web-enabled/networked embodiment of the present invention.

FIG. 5 illustrates a block diagram depicting a conventional client/server communication system, which may be used by an exemplary web-enabled/networked embodiment of the present invention.

A communication system 500 includes a multiplicity of networked regions with a sampling of regions denoted as a network region 502 and a network region 504, a global network 506 and a multiplicity of servers with a sampling of servers denoted as a server device 508 and a server device 510.

Network region 502 and network region 504 may operate to represent a network contained within a geographical area or region. Non-limiting examples of representations for the geographical areas for the networked regions may include postal zip codes, telephone area codes, states, counties, cities and countries. Elements within network region 502 and 504 may operate to communicate with external elements within other networked regions or within elements contained within the same network region.

In some implementations, global network 506 may operate as the Internet. It will be understood by those skilled in the art that communication system 500 may take many different forms. Non-limiting examples of forms for communication system 500 include local area networks (LANs), wide area networks (WANs), wired telephone networks, cellular telephone networks or any other network supporting data communication between respective entities via hard-wired or wireless communication networks. Global network 506 may operate to transfer information between the various networked elements.

Server device 508 and server device 510 may operate to execute software instructions, store information, support database operations and communicate with other networked elements. Non-limiting examples of software and scripting languages which may be executed on server device 508 and server device 510 include C, C++, C# and Java.

Network region 502 may operate to communicate bi-directionally with global network 506 via a communication channel 512. Network region 504 may operate to communicate bi-directionally with global network 506 via a communication channel 514. Server device 508 may operate to communicate bi-directionally with global network 506 via a communication channel 516. Server device 510 may operate to communicate bi-directionally with global network 506 via a communication channel 518. Network region 502 and 504, global network 506 and server devices 508 and 510 may operate to communicate with each other and with every other networked device located within communication system 500.

Server device 508 includes a networking device 520 and a server 522. Networking device 520 may operate to communicate bi-directionally with global network 506 via communication channel 516 and with server 522 via a communication channel 524. Server 522 may operate to execute software instructions and store information.

Network region 502 includes a multiplicity of clients with a sampling denoted as a client 526 and a client 528. Client 526 includes a networking device 534, a processor 536, a GUI 538 and an interface device 540. Non-limiting examples of devices for GUI 538 include monitors, televisions, cellular telephones, smartphones and PDAs (Personal Digital Assistants). Non-limiting examples of interface device 540 include pointing device, mouse, trackball, scanner and printer. Networking device 534 may communicate bi-directionally with global network 506 via communication channel 512 and with processor 536 via a communication channel 542. GUI 538 may receive information from processor 536 via a communication channel 544 for presentation to a user for viewing. Interface device 540 may operate to send control information to processor 536 and to receive information from processor 536 via a communication channel 546. Network region 504 includes a multiplicity of clients with a sampling denoted as a client 530 and a client 532. Client 530 includes a networking device 548, a processor 550, a GUI 552 and an interface device 554. Non-limiting examples of devices for GUI 538 include monitors, televisions, cellular telephones, smartphones and PDAs (Personal Digital Assistants). Non-limiting examples of interface device 540 include pointing devices, mousse, trackballs, scanners and printers. Networking device 548 may communicate bi-directionally with global network 506 via communication channel 514 and with processor 550 via a communication channel 556. GUI 552 may receive information from processor 550 via a communication channel 558 for presentation to a user for viewing. Interface device 554 may operate to send control information to processor 550 and to receive information from processor 550 via a communication channel 560.

For example, consider the case where a user interfacing with client 526 may want to execute a networked application. A user may enter the IP (Internet Protocol) address for the networked application using interface device 540. The IP address information may be communicated to processor 536 via communication channel 546. Processor 536 may then communicate the IP address information to networking device 534 via communication channel 542. Networking device 534 may then communicate the IP address information to global network 506 via communication channel 512. Global network 506 may then communicate the IP address information to networking device 520 of server device 508 via communication channel 516. Networking device 520 may then communicate the IP address information to server 522 via communication channel 524. Server 522 may receive the IP address information and after processing the IP address information may communicate return information to networking device 520 via communication channel 524. Networking device 520 may communicate the return information to global network 506 via communication channel 516. Global network 506 may communicate the return information to networking device 534 via communication channel 512. Networking device 534 may communicate the return information to processor 536 via communication channel 542. Processor 576 may communicate the return information to GUI 578 via communication channel 544. User may then view the return information on GUI 538.

FIG. 6 is a flow chart illustrating an exemplary third component of the invention, in accordance with an embodiment of the invention. In a Step 605 a user may navigate a search panel and input various terms including but not limited to keywords, categories, range of investment amounts, learning based suggested keywords, related dates, and geographical locations of interest. In a Step 610 a mapping server may be displayed which may show a search query in relation to relevant opportunities by way of geospatial markers/identifiers. Alternative ways of showcasing the results could include Table of Lists, Cards on a Website, or Facetal Navigation. In a Step 615 a marker/identifier may be individually clicked on to display more information, and/or a machine learning module may infer what information to show a user, which may be alternatively interfaced with visually/audibly/and/or using touch. In a Step 620 a user may be notified of an interest in subscribers shown by utilizing tools including but not limited to a relevant link, emails, texts, graphical and/or audible means. In a Step 625 retrieving of additional business information may use tools including but not limited to a source third party local search engine, user submitted business information, automated searching of the internet, and/or search engine result analysis. In a Step 630 additional businesses may be showcased on a mapping server along with local investment results. In a Step 635 any additional contact, communication by subscribers, or related information may be stored in a system database and/or remotely such as but not limited to on a cloud.

FIG. 7 is a flow chart illustrating an exemplary control panel sourcing additions of the invention, in accordance with an embodiment of the invention. In a Step 705 suggested services may be found using means including but not limited to search engines, third party websites, related data analysis in general, site history analysis, related data analysis of similar users, and/or neural network/learning/classification based data analysis in general. In a Step 710 a mapping server may showcase suggested local services using tools including but not limited to a GUI map, audible communication, visible communication, and/or tactile communication generally. In an alternative embodiment, suggested local services may be offered to a user through means including but not limited to emails, links, images on a GUI similar to ads, and/or as a section above search results. The local services may also be showcased in a tile format, or in a basic search engine results format, as well as the above. In a Step 715 a system may find matching investors by means including but not limited to sourcing various investment and third-party websites, gathering information from various sources for analysis by the system, related database mining, and/or matching modules which may be applied data analysis from different sources in general. In one embodiment, a crowdfunding $3^{rd}$ party website (this could be either an investment based crowdfunding site, a rewards based crowdfunding site, a donations based crowdfunding site etc.) may utilize the control panel to provide information to the system about one or more of its clients investment opportunities that are advertised on their website, which they will select to be added to the platform. Such information is only a general summary at this point (i.e. business name, address, amount they are looking to raise). The crowdfunding site may provide a website link to their client's advertisement on their site. The link will be the direct link to where such an opportunity is directly located on the crowdfunding website, which will be displayed at the geospatial location of the advertisement and may be clicked on to send a searcher directly to the crowdfunding site. In a Step 720 a system may provide a user with suggestions including but not limited to investors, investments that did well or poorly in the past, local investment websites, business card information, links to additional resources, comparison of investment options, and/or suggestions related to non-investment details which may still help a user make relatively well informed decisions.

Figure 8:
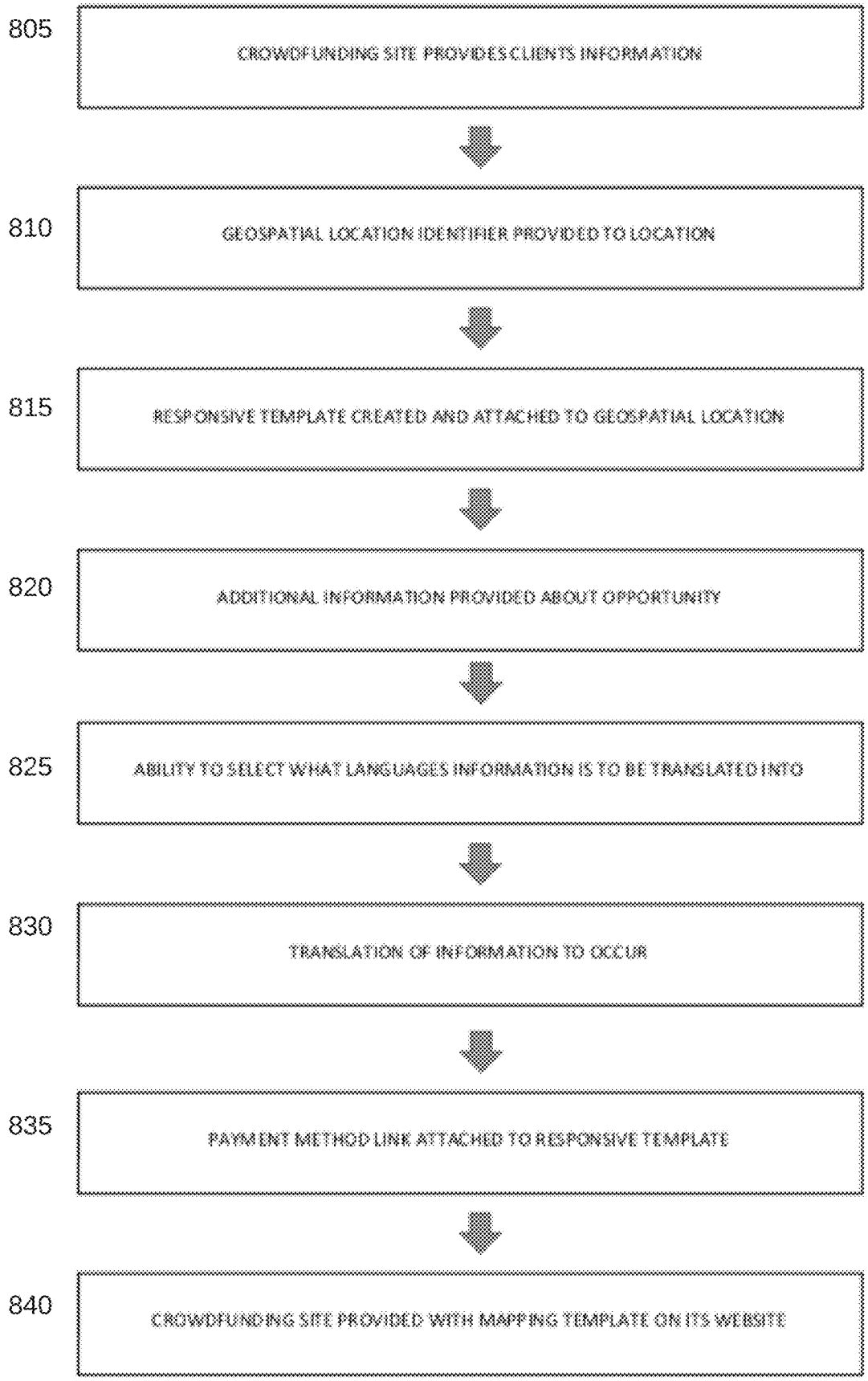
FIG. 8 is a flow chart illustrating an exemplary third component of the invention, in accordance with an embodiment of the invention.

FIG. 8 is a flow chart illustrating an exemplary third component of the invention, in accordance with an embodiment of the invention. In a Step 805 a crowdfunding site may provide clients with information related to local investments using means including but not limited to text in general, graphical user interfaces in general, and/or audible/tactile feedback. A crowdfunding site may be able to log into the system, and then upload all the selected opportunities listed on their website that may be on to the system. These crowdfunding sites may include anything from a site that businesses utilize to raise crowdfunded investments, or to a donation type of crowdfunding site. The result may be that when local investments are searched for to be found geospatially, if a crowdfunding site has an opportunity in that vicinity, the investment may also be showcased. In effect, the system may act as a consolidator to the whole crowdfunding/crowdsourcing industry, showcasing all listed opportunities geospatially. It could be said to be the Google Maps of the crowdfunding industry. In a Step 810 a system may provide a user with a geospatial location identifier using means including but not limited to a mapping GUI, a list with distance information, a list and/or map with location information in general, and/or a list or visual presentation customized for a specific user or for a location in general. The system may provide a geospatial identifier to all selected opportunities that will be uploaded by the crowdfunding site. For example, if the crowdfunding site wants to upload 25 opportunities on the platform, each opportunity may be provided with a geospatial location identifier, which may be the location of the business that is seeking the investment. This in turn may act as an enhancer of such ads, as they will now be able to also be found on a global geospatial platform. In a Step 815 a system may create a responsive template to attach to a geospatial location where the identifier may be provided using means including but not limited to using data analysis to plot or compile text related to local investments, and/or further customized information for a particular investor. The responsive template may be created and attached to the geospatial location marker/identifier in order to display more information that will be able to be viewed on multiple computing devices. A separate template may be created for each investment uploaded by the crowdfunding site. In a Step 820 a system may provide additional information inputted onto the responsive template attached to the geospatial location identifier about opportunities to users which may include but it not limited to personal contact information, business history, ratings for previous work, and/or similar investors which may be almost close enough to be locals. A video may also be uploaded to the responsive template in order to enhance the marketing of the crowdfunding opportunity. Geospatial location marker/identifier may be provided to the crowdfunding investment opportunity uploaded by the crowdfunding site (along with having the above information attached to such a location). Geospatial location marker to be in the precise location address that is provided by the crowdfunding site for the investment. The crowdfunding site may further provide additional information. Such additional information may range from a further in depth description, attachment of pictures, and also attachments of videos, all to support the opportunity, which will be displayed on the responsive template. In a Step 825 a system may select what language information may be translated into using means including but not limited to analysis of text used by a user, or determining IP location, and/or by looking up a user preference. In a Step 830 a system may decide if language translation is needed using means including but not limited to a language detection module. Translation of selected template information into selected languages may be by direct human translation or by utilizing one or more hardware processors and databases, along with one or more artificial intelligence language translation services. In a Step 835 a system may link a payment method for a user on a responsive template using means including but not limited to adding website links on a website/email code. The payment method may be attached to the responsive template which will link directly to the crowdfunding sites payment account. This will provide the advantage of being able to make donations to countries that wouldn't be possible without the language translation in many cases. In a Step 840 a system may provide a crowdfunding site with mapping template on its website using means including but not limited to website links, and/or crowdfunding sites. The crowdfunding sites investments may be inserted into the system. For example, if the crowdfunding site uploads 20 of the investments it has listed on its current site, the mapping template may showcase all of the 20 opportunities. The same as when a user search Google for local businesses in a specified location and have say 10 relevant results come up on a mapping server. This however, will allow the crowdfunding sites to automatically showcase all of their opportunities they have listed on the platform inserted within the GUI for the system. Crowdfunding parties may be given the ability to choose whether they want the information displayed to be translated into different languages. This will provide the ability for such investments/donation opportunities etc. to be showcased to users around the world in multiple languages. A third party crowdfunding site may provide a template on its websites homepage showcasing all of its client's uploaded investments, along with their precise geospatial location markers, on a mapping server. The template may be able to be clicked on by a user to direct them to the platform. For instance, if an investment based crowdfunding site uploads 50 of the investment opportunities it has on its website, all such investments location will be showcased on the mapping server by way of geospatial identifiers/markers. In this manner, the system may act as a global consolidator to the crowdfunding industry. The system may allow all the different crowdfunding platforms to showcase and list all of the available crowdfunding type of opportunities that they have listed on their websites, which can then be found and accessed through geospatial search processes. This method may also be able to be done for the classified ads industry, to consolidate by way of geospatial methods. In an alternative embodiment, the crowdfunding industry could be consolidated by way of vertical search engines that would crawl through the numerous crowdfunding websites worldwide and showcase the relevant results. Once the relevant results are showcased, a user could click add and then be directed to the crowdfunding site. Also, the results page could integrate Google Maps in order to geo-locate the address of relevant ads that are showcased.

FIG. 9 is a flow chart illustrating an exemplary third component of the invention, in accordance with an embodiment of the invention. In a Step 905 a local investment club may provide users with additional information related and/or not directly related to investing using means including but not limited to GUI text/multimedia, emails, and/or tactile/audio feedback. In a Step 910 a system may create a responsive template and attached to a geospatial location of the investment club using means including but not limited to analyzing user input to provide an appropriate response then analyzing a users' response for to determine how a responsive template may be applied to a specific user. In a Step 915 a system may provide club current and potential investments using means including but not limited to data retrieval based on a list of filters or database mining tools, and/or processing user input to determine which investment best fit a certain user. In a Step 920 a system may provide a geospatial location identifier for all investment results, using means including but not limited to database mining for location related information, retrieving user preferences for locations, and/or using context clues to determine where an investment would do relatively well. These investments may be showcased on the mapping server on the responsive template. In a Step 925 a system may provide a video link for streaming video attached to the template, using means including but not limited to multimedia processing standards for the internet, and/or inserting a video stream into whatever GUI/interface a user is currently using. In a Step 930 a system may attach a link to a template for a membership request using means including but not limited to providing a website link on a user's GUI and/or alternative interface.

FIG. 10 is a flow chart illustrating an exemplary control panel sourcing additions of the invention, in accordance with an embodiment of the invention. In a Step 1005 a system may provide additional information using means including but not limited to business conducting pre-sales, a direct public offering (DPO), and/or related services/actions where relevant additional information may be extracted. In a Step 1010 a system may create a responsive template attached to a geospatial location using means including but not limited to including additional information in a user's interface. In a Step 1015 a system may upload additional files and to a template using means including but not limited to network-based data transmission. In a Step 1020 a system may attaching a payment link to a template using means including but not limited to inserting a user specific link onto an HTML link's code, and/or referring a user to where they may carry out similar services. In a Step 1025 a system may send relevant documents to a subscriber once purchase/payment has been processed using means including but not limited to attaching documents to confirmation emails, allowing a user to download related documents, and/or having the paperwork sent to a user through a post office/delivery company.

Those skilled in the art will readily recognize, in light of and in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied.

It will be further apparent to those skilled in the art that at least a portion of the novel method steps and/or system components of the present invention may be practiced and/or located in location(s) possibly outside the jurisdiction of the United States of America (USA), whereby it will be accordingly readily recognized that at least a subset of the novel method steps and/or system components in the foregoing embodiments must be practiced within the jurisdiction of the USA for the benefit of an entity therein or to achieve an object of the present invention. Thus, some alternate embodiments of the present invention may be configured to comprise a smaller subset of the foregoing means for and/or steps described that the applications designer will selectively decide, depending upon the practical considerations of the particular implementation, to carry out and/or locate within the jurisdiction of the USA. For example, any of the foregoing described method steps and/or system components which may be performed remotely over a network (e.g., without limitation, a remotely located server) may be performed and/or located outside of the jurisdiction of the USA while the remaining method steps and/or system components (e.g., without limitation, a locally located client) of the forgoing embodiments are typically required to be located/performed in the USA for practical considerations. In client-server architectures, a remotely located server typically generates and transmits required information to a US based client, for use according to the teachings of the present invention. Depending upon the needs of the particular application, it will be readily apparent to those skilled in the art, in light of the teachings of the present invention, which aspects of the present invention can or should be located locally and which can or should be located remotely. Thus, for any claims construction of the following claim limitations that are construed under 35 USC § 112 (6) it is intended that the corresponding means for and/or steps for carrying out the claimed function are the ones that are locally implemented within the jurisdiction of the USA, while the remaining aspect(s) performed or located remotely outside the USA are not intended to be construed under 35 USC § 112 (6).

It is noted that according to USA law, all claims must be set forth as a coherent, cooperating set of limitations that work in functional combination to achieve a useful result as a whole. Accordingly, for any claim having functional limitations interpreted under 35 USC § 112 (6) where the embodiment in question is implemented as a client-server system with a remote server located outside of the USA, each such recited function is intended to mean the function of combining, in a logical manner, the information of that claim limitation with at least one other limitation of the claim. For example, in client-server systems where certain information claimed under 35 USC § 112 (6) is/(are) dependent on one or more remote servers located outside the USA, it is intended that each such recited function under 35 USC § 112 (6) is to be interpreted as the function of the local system receiving the remotely generated information required by a locally implemented claim limitation, wherein the structures and or steps which enable, and breath life into the expression of such functions claimed under 35 USC § 112 (6) are the corresponding steps and/or means located within the jurisdiction of the USA that receive and deliver that information to the client (e.g., without limitation, client-side processing and transmission networks in the USA). When this application is prosecuted or patented under a jurisdiction other than the USA, then "USA" in the foregoing should be replaced with the pertinent country or countries or legal organization(s) having enforceable patent infringement jurisdiction over the present application, and "35 USC § 112 (6)" should be replaced with the closest corresponding statute in the patent laws of such pertinent country or countries or legal organization(s).

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC § 112 (1), all claims must be supported by sufficient disclosure in the present patent specification, and any material known to those skilled in the art need not be explicitly disclosed. However, 35 USC § 112 (6) requires that structures corresponding to functional limitations interpreted under 35 USC § 112 (6) must be explicitly disclosed in the patent specification. Moreover, the USPTO's Examination policy of initially treating and searching prior art under the broadest interpretation of a "mean for" or "steps for" claim limitation implies that the broadest initial search on 35 USC § 112(6) (post AIA 112(0) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC § 112(6) (post AIA 112(0) when such corresponding structures are not explicitly disclosed in the foregoing patent specification. Therefore, for any invention element(s)/structure(s) corresponding to functional claim limitation(s), in the below claims interpreted under 35 USC § 112(6) (post AIA 112(0), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC § 112(6) (post AIA 112(f)) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any $3^{rd}$ parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC § 112(6) (post AIA 112(f)), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC § 112 (6). Applicant (s) note that all the identified documents above which are incorporated by reference to satisfy 35 USC § 112 (6) necessarily have a filing and/or publication date prior to that of the instant application, and thus are valid prior documents to incorporated by reference in the instant application.

Having fully described at least one embodiment of the present invention, other equivalent or alternative methods of implementing investment tools according to the present invention will be apparent to those skilled in the art. Various aspects of the invention have been described above by way of illustration, and the specific embodiments disclosed are not intended to limit the invention to the particular forms disclosed. The particular implementation of the investment tools may vary depending upon the particular context or application. By way of example, and not limitation, the investment tools described in the foregoing were principally directed to local investment platform implementations; however, similar techniques may instead be applied to connecting investors, or charities, or funding for entertainment/media production, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. That is, the Abstract is provided merely to introduce certain concepts and not to identify any key or essential features of the claimed subject matter. It is submitted with the understanding that it will not be used to limit or interpret the scope or meaning of the claims.

The following claims are hereby incorporated into the detailed description, with each claim standing on its own as a separate embodiment.

What is claimed is:

1. A method comprising the steps of:
   displaying, on a control panel of a GUI, a login and verification step, whereby said control panel receives login credentials, wherein said login and verification step further includes a geospatial-based crowdfunding site receiving said login credentials, in which said geospatial-based crowdfunding site comprises at least one of, an investment based geospatial crowdfunding site, a rewards based geospatial crowdfunding site, and a donations based geospatial crowdfunding site;
   displaying, on said control panel, upon completion of said verification step, an interactive template configured to receive information, further including:
   receiving, by said control panel, at least an opportunity listed in said geospatial-based crowdfunding site in which said opportunity comprises at least one of a business looking to raise capital, a rewards-based opportunity, a donations-based opportunity, and a business conducting Pre-Sales to raise money;
   implementing a responsive template software module for said opportunity, in which said responsive template software module comprises a data analysis tool that is configured to plot or compile text related to local investments;
   associating a geospatial location identifier to said responsive template software module;
   receiving, by said control panel, said information in said responsive template software, in which said information includes at least one of, an in-depth description, attachments of pictures, and attachments of videos, to support said opportunity; and
   compiling said information in said responsive template into an entry for said opportunity;

associating a geo location marker characteristic that is then stored in a geospatial mapping server, upon receipt of said information, whereby said geo location marker is integrated into viewable information on said control panel, and further includes attaching a geospatial location identifier to said opportunity, in which said geospatial location identifier comprises at least a geospatial location of said opportunity and at least one of, a mapping GUI of said business, a list with distance information to said business, and a list or map with location information of said business;

showcasing, on said geospatial mapping server, said geospatial location identifier attached to said opportunity, wherein said geospatial location identifier is configured to show where said opportunity is located; and displaying, on said control panel, said information, whereby said information displayed on said control panel is obtained by implementing filters and presenting local investments on a geospatial mapping server software module.

2. The method of claim 1, in which said showcasing step further comprise the steps of:
receiving a language selection, wherein said information contained in said responsive template software application is translated into said language selection by one or more hardware processors and databases, along with one or more artificial intelligence language translation services.

3. The method of claim 2, in which said showcasing step further comprise the steps of:
presenting said information contained in said responsive template software application information in said language selection.

4. The method of claim 3, further comprising the steps of:
linking a payment method to said geospatial crowdfunding site, wherein said payment method is attached to said template software application.

5. The method of claim 4, in which said showcasing step further comprise the steps of:
showcasing said uploaded investments of said geospatial-based crowdfunding site, along with a geospatial location marker of each of said uploaded investments, on said geospatial mapping server; and
wherein said geospatial mapping server comprises at least a GUI map of said uploaded investments and at least one of, an audible communication, a visible communication, and a tactile communication.

6. The method of claim 1, further comprising the steps of:
receiving a control panel software module, in which said control panel software application is configured to be operable for, at least one of, change information, add additional uploads, and conduct geospatial-based searches.

7. The method of claim 6, further comprising the steps of:
requesting information regarding at least one of, regulations, courses, mentorship, how to write a business plan, capital raising methods, learning basic business, and accounting skills sourced from a third-party search engine; and
presenting geospatial-based search results in a tabular form in said control panel software application.

8. A non-transitory computer-readable storage medium with an executable program stored thereon, wherein the program instructs one or more processors to perform a method comprising the steps of:
displaying, on a control panel of a GUI, a login and verification step, whereby said control panel receives login credentials, wherein said login and verification step further includes a geospatial-based crowdfunding site receiving said login credentials;

displaying, on said control panel, upon completion of said verification step, an interactive template configured to receive information, further including:

receiving, by said control panel, at least an opportunity listed in said geospatial-based crowdfunding site;

compiling said information in said responsive template into an entry for said opportunity;

associating a geo location marker characteristic that is then stored in a geospatial mapping server, upon receipt of said information, whereby said geo location marker is integrated into viewable information on said control panel, and further includes attaching a geospatial location identifier to said opportunity;

in which said geospatial location identifier is configured to enable a geospatial search and discovery processes for at least one of said, local entrepreneur, an investment opportunity, and a local investor;

in which said geospatial location identifier comprises a geospatial location of said opportunity and at least one of, a mapping GUI of said opportunity, a list with distance information to said opportunity, and a list or map with location information of said opportunity;

showcasing, by said geospatial-based crowdfunding site, said geospatial location identifier attached to said opportunity, wherein said geospatial location identifier is configured to show where said opportunity is located;

displaying, on said control panel, said information, whereby said information displayed on said control panel is obtained by:

implementing filters;

querying local investments, said querying local investments step comprises detecting said geospatial location identifier, wherein said geospatial location identifier is configured to enable said querying local investments step where said opportunity is located; and presenting said local investments on a geospatial mapping server software module.

9. The software program product of claim 8, in which said local investments comprises:
at least one or more local investment clubs;
an industry which said local investment club is focusing on; and
an amount of members said local investment club is capped to.

10. The software program product of claim 9, in which said geospatial-based crowdfunding site comprises at least one of, an investment based geospatial crowdfunding site, a rewards based geospatial crowdfunding site, and a donations based geospatial crowdfunding site.

11. The software program product of claim 10, in which said opportunity comprises at least one of one or more, businesses looking to raise capital, businesses looking to finance new stores or upgrade equipment, businesses offering Direct Public Offerings, businesses conducting Pre-Sales to raise money, and Housing Projects.

12. The software program product of claim 11, in which said showcasing step further comprise the steps of:
receiving a template software application created for said selected opportunity, in which an information contained in said template software application includes at least one of, an in-depth description, attachment of pictures, and attachment of videos, to support said opportunity, wherein said template software application is configured to attach to said geospatial location.

13. The software program product of claim 12, in which said showcasing step further comprise the steps of:
- receiving a language selection, wherein said information contained in said template software application is translated into said language selection by at least one or more hardware processors and databases, along with at least one or more artificial intelligence language translation services.

14. The software program product of claim 13, in which said showcasing step further comprise the steps of:
- presenting said information contained in said template software module information in said language selection.

15. The software program product of claim 8, further instructing one or more processors to perform a method comprising the steps of:
- linking a payment method to said geospatial-based crowdfunding site, wherein said payment method is attached to said template software module.

16. The software program product of claim 15, in which said showcasing step further comprise the steps of:
- showcasing uploaded investments of said geospatial-based crowdfunding site, along with a geospatial location marker of each of said uploaded investments, on said geospatial mapping server; and
- wherein said geospatial mapping server comprises at least a GUI map and at least one of, an audible communication, a visible communication, and a tactile communication.

17. The software program product of claim 16, further instructing one or more processors to perform a method comprising the steps of:
- receiving a control panel software module, in which said control panel software module is configured to, at least one of, change information, add additional uploads, and conduct geospatial-based searches.

18. The software program product of claim 17, further instructing one or more processors to perform a method comprising the steps of:
- requesting information regarding at least one of, regulations, courses, mentorship, how to write a business plan, capital raising methods, learning basic business, and accounting skills sourced from a third-party search engine, wherein said search results are configured to be provided in a tabular form in said control panel software module.

* * * * *